May 29, 1934.  E. J. KNEUER  1,960,539
TAILBOARD MOUNTING FOR TRUCKS AND THE LIKE
Filed Jan. 3, 1933
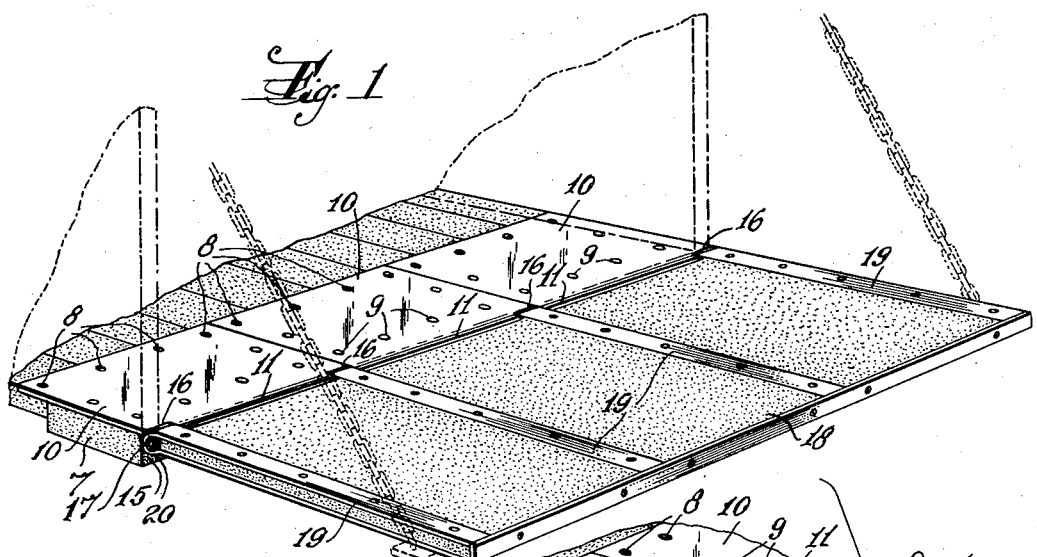
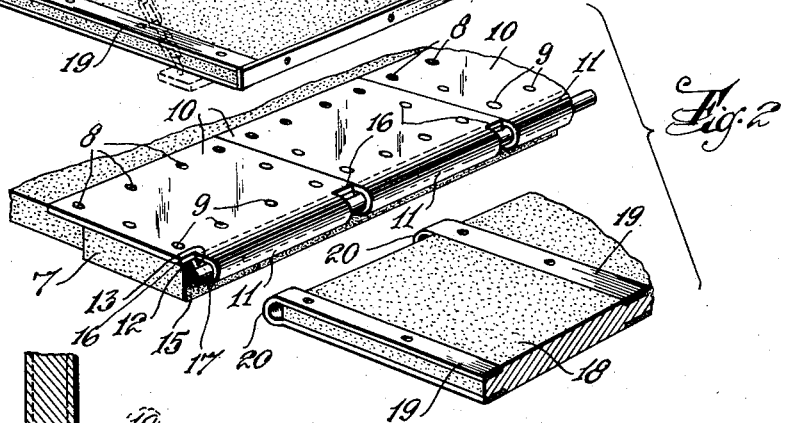
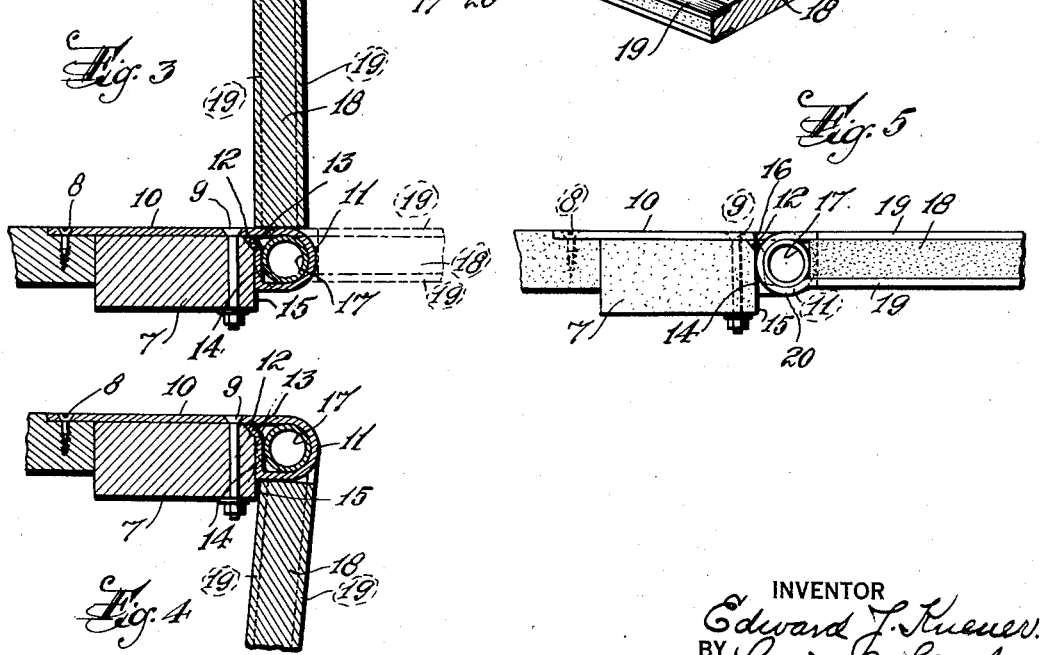
INVENTOR
Edward J. Kneuer
BY
Fred C. Fischer
ATTORNEY Patented May 29, 1934

1,960,539

UNITED STATES PATENT OFFICE 1,960,539

TAILBOARD MOUNTING FOR TRUCKS AND THE LIKE

Edward J. Kneuer, Newark, N. J.

Application January 3, 1933, Serial No. 649,949

4 Claims. (Cl. 296—57)

This invention relates to improvements in tailboards and tailboard mounting for trucks and the like.

It is an object of this invention to provide a tailboard and tailboard mounting for trucks, which mounting serves as a hinge for the tailboard and as a bumper or protective device for the truck.

A further object is the provision of a tailboard and tailboard mounting for trucks which enables a substantially flush surface and close joint between the tailboard and the floor of the truck when the tailboard is lowered to permit loading of the truck.

A further object is the provision of a tailboard mounting which is attached to the upper surface only of the floor and is rigid and strong, and in which stresses on the tailboard are transmitted to the tail end floor of the truck without effecting the attaching means of the mounting.

A further object is the provision of a hinge connection between a tailboard and the floor of a truck in which a pipe or rod is utilized as a pivot and in which part of the knuckles of the hinge are formed by providing notches in metallic tubular sections attached to the floor of the truck, and cooperating hinge knuckles which consist of looped straps projecting from the edge of the tailboard.

These and other advantageous objects which will later appear, are accomplished by the simple and practical construction and arrangement of parts hereinafter described and exhibited in the accompanying drawing, forming part hereof, and in which:

Fig. 1 is a perspective view of the end portion of a truck having a tailboard and mounting embodying my invention, Fig. 2 is an enlarged fragmentary perspective view of the tailboard and mounting, Fig. 3 is a fragmentary sectional view of a tailboard and mounting with the tailboard in a raised position, Fig. 4 is a similar fragmentary view showing the tailboard lowered, and Fig. 5 is a side view of the tailboard and mounting with a tailboard level with the floor of the truck.

Referring to the drawing, the floor 7 of a track has attached thereto by means of screws 8 and bolts 9, preferably a plurality of metal plates 10, which have their free edges formed into substantially tubular sections 11, with a flat surface 14 lying flat against the flat tail end 15 of the floor 7, and an inclined flange 13 resting on the bevelled upper corner 12 of the tail end 15 of the floor. Instead of a plurality of metal plates 10, a single metal plate of the width of the floor of the truck may be used, if desired.

A pivot member 17, in the form of a metal pipe or rod is rotatably positioned in the tubular sections 11; the pivot 17 passing also through the loops or knuckles 20 formed by the straps 19 which embrace the upper and lower surfaces of the tailboard 18, the tubular sections 11 having cut-out portions 16 to accommodate the loops or knuckles 20.

From the above description, it will be seen that I have provided a tailboard mounting which can be readily and conveniently applied to a truck. It will be noted that no part of the plates 10 engage the underside of the floor 7, and all stresses applied to the mounting are directed down upon the floor or against the tail end 15 of the floor, thereby eliminating the possibility of the mounting being loosened or weakened by the pulling out or loosening of the screws 8 and bolts 9, as obviously no stresses can be applied to the mounting which could affect the screws and bolts to cause them to become disengaged from the floor.

For example, when the tailboard is in the position shown in Fig. 3, the weight of the tailboard bears down on the sections 11 and tend to rotate the plates clockwise; but such movement is resisted by the engagement of the flat surface 14 with the tail end 15. Similarly, when the tailboard is lowered, as shown in Fig. 4, the stresses are resisted by the tail end 15 and the beveled portion 12 of the floor.

The foregoing disclosure is to be regarded as descriptive and illustrative only, and not as restrictive or limitative of the invention, of which obviously an embodiment may be constructed including many modifications, without departing from the general scope herein indicated and denoted in the appended claims.

Having thus described my invention, what I claim as new and desire to secure by Letters Patent, is:

1. A tailboard and tailboard mounting for trucks, comprising a plurality of hinge plates secured to the upper surface of the floor of a truck, each of said plates having a tubular section abutting the tail end of the floor, the tail end of the floor having its upper corner beveled, inclined flanges on the tubular sections of the plates resting on the beveled area of the tail end, said tubular sections having spaced cut-out portions, a tailboard having spaced straps attached thereto, said straps being provided with loops fitting in the cut-out portions of the tubular sections, and a pivot member extending through the tubular sections and the loops.

2. In combination with a truck having a floor with its upper corner of its tail end bevelled, a tailboard and tailboard mounting, comprising a plurality of metal plates attached to the upper surface only of the floor, each of said plates having a tubular section abutting the tail end of the floor and having an inclined flange resting on the beveled upper corner of the floor, a tailboard, a plurality of straps fixed to the tailboard and provided with looped portions extending beyond an edge of the tailboard, said tubular sections having cut-out portions to accommodate said looped portions of the straps, and a pivot member extending through the tubular sections and the looped portions of the straps to provide a hinge connection between the truck floor and the tailboard.

3. In combination with the floor of a truck, said floor having a tail end provided with a beveled upper corner, a tailboard mounting comprising a plurality of plates attached to the upper surface only of the floor, each of said plates having a tubular section abutting the tail end of the floor and a flat flange engaging the beveled corner of the floor, a tailboard, and means to pivotally connect the tailboard with the tubular sections.

4. In combination with the floor of a truck, said floor having a tail end provided with a bevelled upper corner, a tailboard mounting comprising a plate attached to the upper surface only of the floor, said plate having a tubular section abutting the tail end of the floor and a flange engaging the bevelled corner of the floor, a tailboard, and means to pivotally connect the tailboard with the tubular section.

EDWARD J. KNEUER.